United States Patent [19]

Morita et al.

[11] Patent Number: 4,847,799

[45] Date of Patent: Jul. 11, 1989

[54] KEYBOARD APPARATUS HAVING SEPARATE WORKING AREAS WITH THUMB-OPERATED SHIFTING OF KEY FUNCTIONS

[75] Inventors: Masasuke Morita; Toshio Shimada; Toshiro Kitazaki, all of Tokyo, Japan

[73] Assignee: NEC Corporation, Japan

[21] Appl. No.: 39,610

[22] Filed: Apr. 17, 1987

[30] Foreign Application Priority Data

Apr. 22, 1986 [JP] Japan ................................ 61-93625

[51] Int. Cl.⁴ .............................................. G06F 3/00
[52] U.S. Cl. ........................... 364/709.12; 364/709.15
[58] Field of Search ...................... 364/709.01, 709.16; 340/365 R, 711; 400/472, 486, 489; 235/145 R

[56] References Cited

PUBLICATIONS

Morita, "Japanese Text Input System", IEEE—Computer, May 1985, pp. 29-35.
Montgomery, "Bringing Manual Input into the 20th Century; New Keyboard Concepts", IEEE—Computer, Mar. 1982, pp. 11-17.
Conway, "Digital X' Typewriter Keyboard", IBM Technical Disclosure Bulletin, vol. 18, No. 12, May 1976, pp. 4187-4190.

Primary Examiner—Gary V. Harkcom
Assistant Examiner—Long Thanh Nguyen
Attorney, Agent, or Firm—Laff, Whitesel, Conte & Saret

[57] ABSTRACT

A keyboard apparatus comprises a row of control keys operated by the left-hand thumb of an operator, a row of control keys operated by the operator's right-hand thumb, a first group of data entry keys arranged in a matrix of three rows and five columns in a first working area to be operated by the operator's first to fourth left-hand fingers, and a second group of data entry keys arranged in the same manner as the first in a second working area to be operated by the operator's first to fourth right-hand fingers. The first and second working areas are oriented so that the columns of the first and second groups are generally aligned with the left- and right-hand fingers, respectively. Responsive to operation of each control key, the function of the data entry keys is changed so that when a first control key is operated virtual cursor keys are formed in one of the working areas and when a second control key is operated virtual ten digit keys are formed by some of the data entry keys in one of the working areas, and when a third control key is operated virtual instruction keys are formed in the working areas for entering basic processing instruction data, symbols and characters.

8 Claims, 5 Drawing Sheets

KEYBOARD APPARATUS HAVING SEPARATE WORKING AREAS WITH THUMB-OPERATED SHIFTING OF KEY FUNCTIONS

BACKGROUND OF THE INVENTION

The present invention relates to a keyboard apparatus for word processors and personal computers.

Conventional keyboards for word processors and personal computers comprise a plurality of data entry keys which are arranged in horizontal parallel rows in closely spaced apart relationship in a single working area, so that the operator's hands make an angle to the horizontal rows of the keyboard if they are kept in comfortable positions. Therefore, the operator must make some effort unconsciously to bend his or her hands somewhat outwardly from the comfortable positions to keep the finger tips to generally align with the horizontal rows. This produces a constant stress on the operator's hands and arms and eventually reduces working efficiency and increases fatigue.

To overcome this problem, Japanese text keyboards have been developed and manufactured. In this keyboard data entry keys are divided into two separate groups each having fifteen keys arranged in a matrix of three rows and five columns. The columns of both groups extend in directions aligned with the directions of the operator's arms held in comfortable positions so that the operator's finger tips generally align with the horizontal rows of each group.

However, the cursor keys, the ten digit keys and other function keys are located in separate areas, which frequently requires the operator to leave his or her hands off their home positions during typing operations and increases the likelihood of generating typing errors.

SUMMARY OF THE INVENTION

It is therefore an object of the present invention to provide a keyboard apparatus which eliminates frequent leaving of operator's hands off the keyboard working area while providing a high degree of typing efficiency.

The keyboard apparatus of the invention comprises a first row of control keys to be operated by the left-hand thumb of an operator, a second row of control keys to be operated by the right-hand thumb of the operator, a first group of data entry keys arranged in a matrix of three rows and five columns in a first working area to be operated by the first to fourth left-hand fingers of the operator, and a second group of data entry keys arranged in a matrix of three rows and five columns in a second working area to be operated by the first to fourth right-hand fingers of the operator. Each of the data entry keys of both groups has a prescribed function when none of the control keys is operated. The first and second working areas are oriented so that the columns of the first and second groups are generally aligned with the left- and right-hand fingers of the operator, respectively. Responsive to operation of each of the control keys of the first and second rows, the function of the data entry keys of either group is changed so that when a first one of the control keys is operated virtual cursor keys are formed in one of the working areas to allow a cursor in a display to be moved in any desired direction and when a second one of the control keys is operated virtual ten digit keys are formed in one of said working areas for entering numeric data, and when a third one of the control keys is operated virtual instruction keys are formed in said working areas for entering basic processing instruction data, symbols and characters.

By virtue of the thumb-cotrolled virtual keys, all data entry can be effected with fingers with a minimum finger travel from their home positions and by virtue of the separate working areas the amount of fatigue and hence typing errors can be further reduced.

BRIEF DESCRIPTION OF THE DRAWINGS

The present invention will be described in further detail with reference to the accompanying drawings, in which.

DETAILED DESCRIPTION

Figure 1:
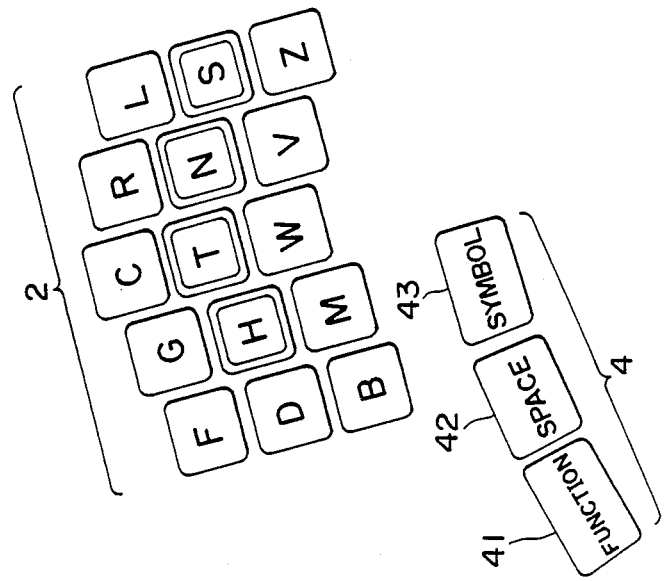
FIG. 1 is an illustration of a keyboard according to an embodiment of the present invention.
Figure 1:
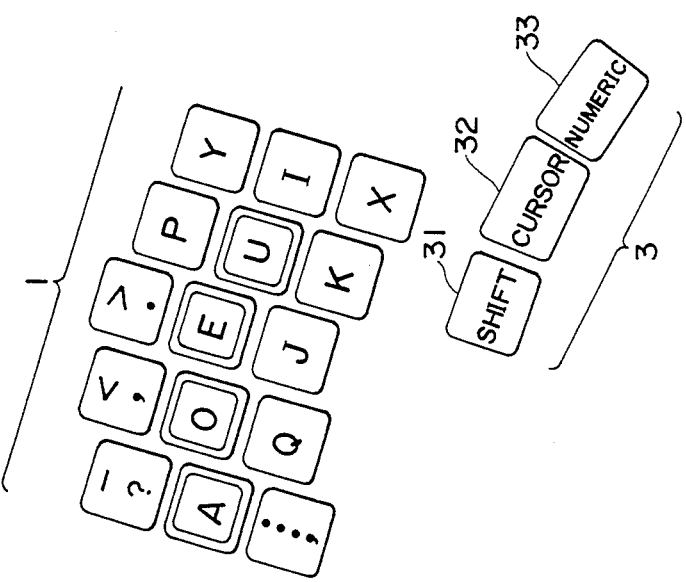

Referring to FIG. 1, there is shown a keyboard according to an embodiment of the present invention. The keyboard comprises a group of data entry keys 1 which are to be manipulated by the first to fourth left-hand fingers of an operator and a group of data entry keys 2 which are to be manipulated by the first to fourth right-hand fingers of the operator. Adjacent to the left-hand side data entry keys 1 is a row of control keys 3 which are to manipulated by the left-hand thumb and adjacent to the right-hand side data entry keys 2 is a row of control keys 4 which are to be manipulated by the operator's right-hand thumb.

Each group of the data entry keys 1 and 2 is a matrix array of three rows and five columns which are located in a separate working area and oriented so that the columns are generally aligned with the operator's fingers when the operator's hands and arms are held in comfortable positions. The rows of each group are slightly arched to conform to the contour of the operator's finger tips. These data entry keys have designations according to a scheme known as "Dvorak Simplified Keyboard" in which the A, O, E, U and I keys are on the middle row of group 1 as home positions for the left-hand fingers and the H, T, N and S keys are on the middle row of group 2 as home positions for the right-hand fingers. Control keys 3 and 4 are arranged to conform to the locus of movement of the associated thumbs. With the above key arrangement and orientation, the typist is allowed to keep his or her arms in the most comfortable positions and all the data entry keys can be accessed with a minimum of finger travel. Control keys 3 comprise a SHIFT key 31, a CURSOR key 32 and a NUMERIC key 33. Control keys 4 comprise a FUNCTION key 41, a SPACE key 42 and a SYMBOL key 43.

Figure 2:
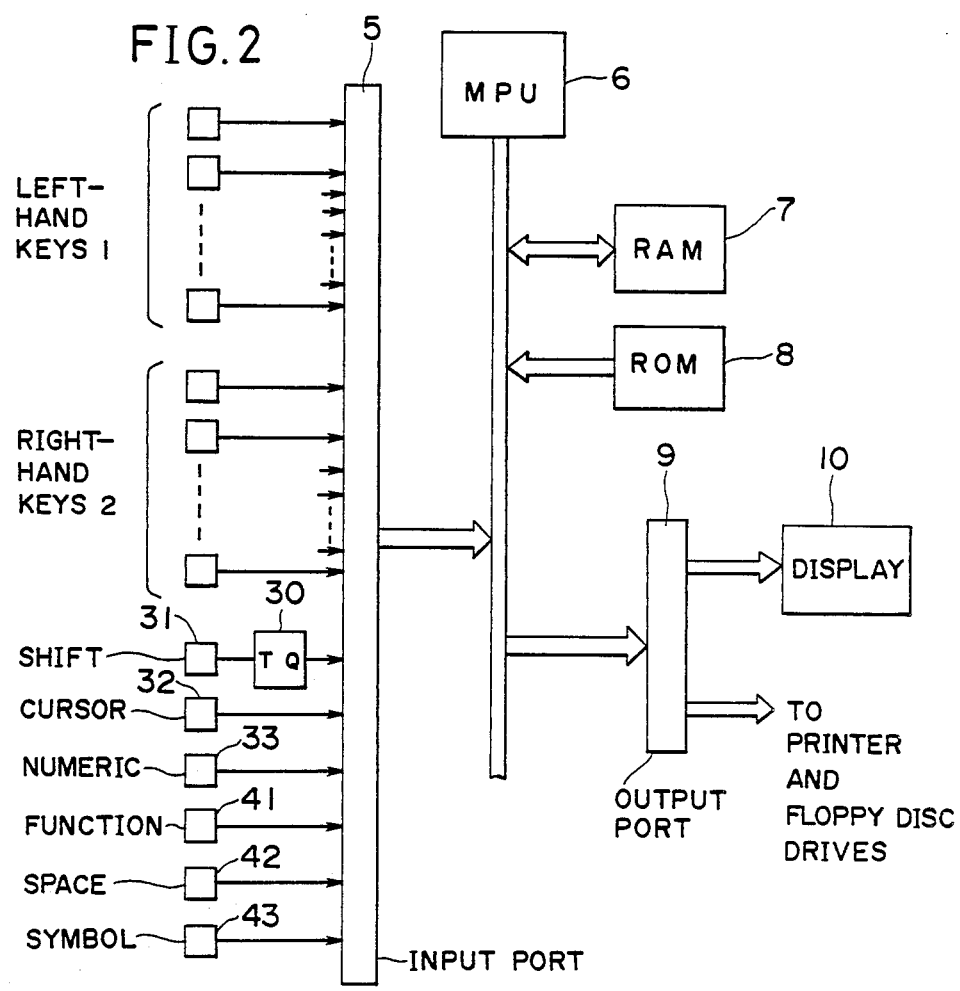
FIG. 2 is a block diagram of a word processor illustrating electrical connections of the keyboard to a microprocessor.
Figure 3:
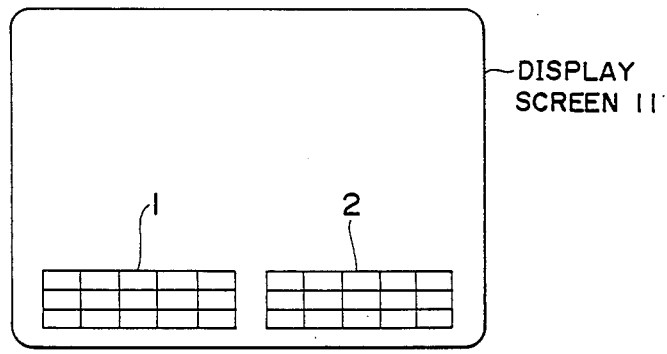
FIG. 3 is an illustration of a display of virtual keys in a lower part of a screen.

As schematically shown in FIG. 2, all the data entry keys 1 and 2 and control keys 3 and 4 are connected to an input port 5 of a word processor which comprises a microprocessor unit 6, a random access memory 7, a read-only memory 8 and an output port 9. The SPACE key 42 has the same function as in conventional typewriters and wordprocessors. Each of the CURSOR, NUMERIC, FUNCTION and SYMBOL keys has a novel function. When operated, each of these control keys applies a particular command signal to the microprocessor 6 to cause it to change the individual function of all the finger-operated keys 1 and 2 in accordance with a set of instructions stored in the read-only memory 8 corresponding to the operated control key. In the absence of a command signal from the control keys, the microprocessor 6 retrieves data from the read only memory 8 which represents a set of lowercase letters and in response to a command signal from the SHIFT key 31, it retrieves data which represents the uppercase letters as in conventional work processors. The thumb-operated SHIFT key 31 is connected through a T-flip-flop 30 to the input port 5 to give it the same function as the LOCK key of the conventional word processor. Thus, the operator needs to operate the SHIFT key 31 again to return to lowercase letters. In response to each command signal from the control keys other than the SHIFT and SPACE keys, the microprocessor 6 generates an image signal which is applied through the output port 9 to a display 10 to provide a display of "virtual" keys on a lower part of a video display screen 11 in matrix array positions corresponding to the positions of the physical keys 1 and 2 (see FIG. 3). Random access memory 7 stores processed data for transfer to a printer and floppy disc drives on command.

Figure 4:
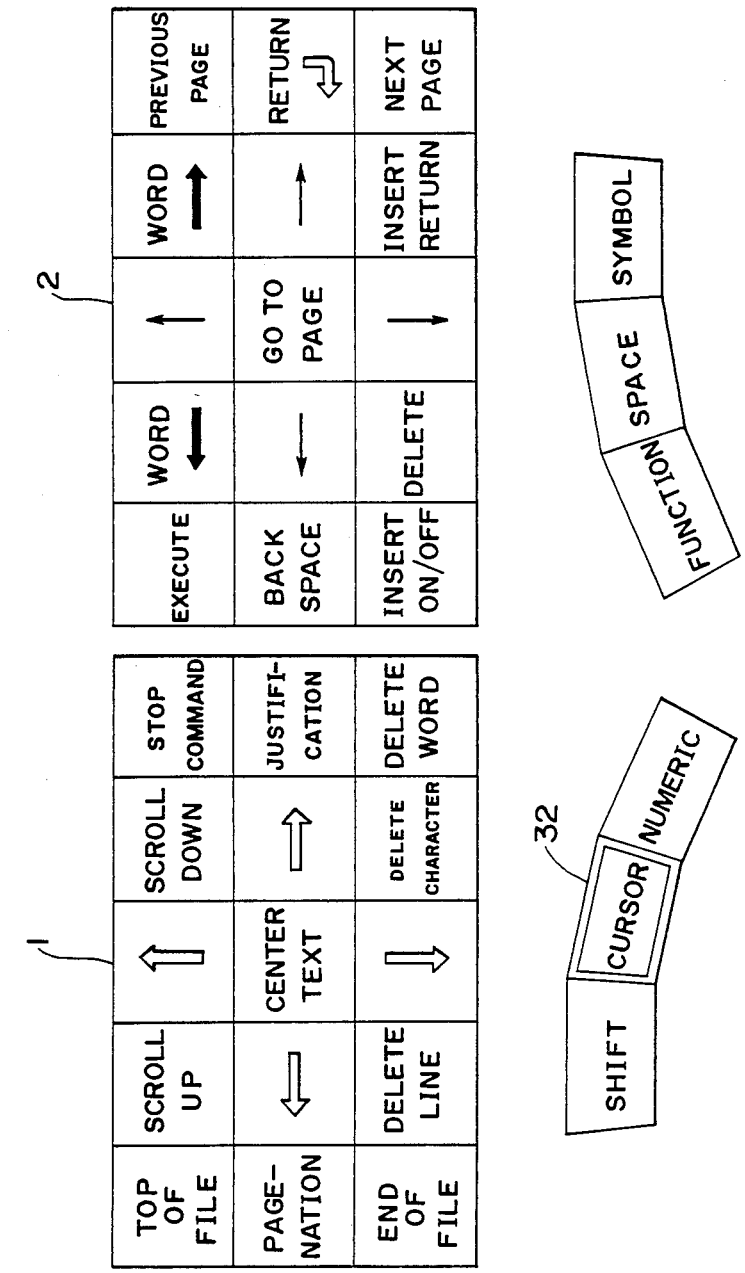
FIG. 4 is an illustration of virtual keys which appear on the display when the CURSOR key is operated.
Figure 5:
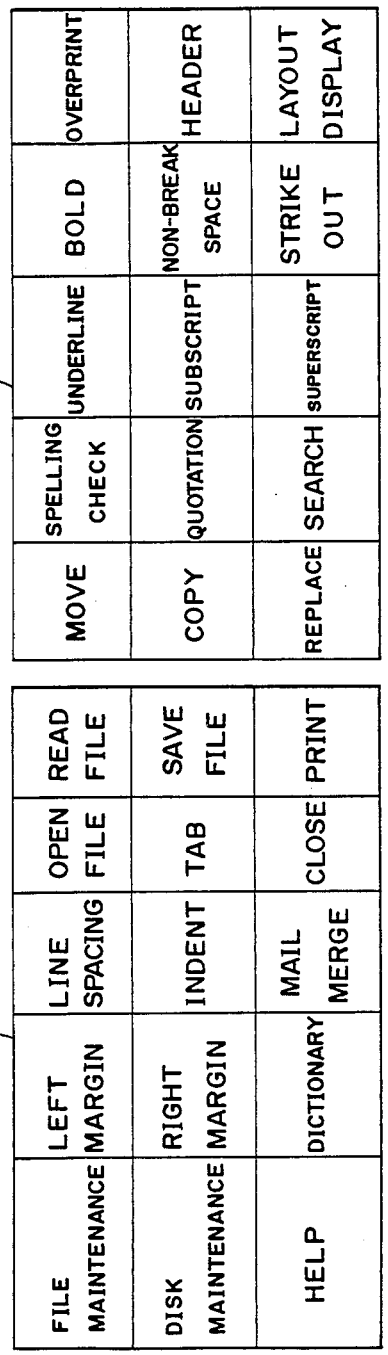
FIG. 5 is an illustration of virtual keys which appear on the display when the FUNCTION key is operated.
Figure 5:
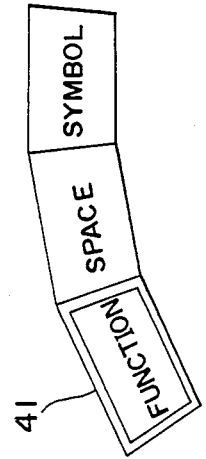
Figure 5:
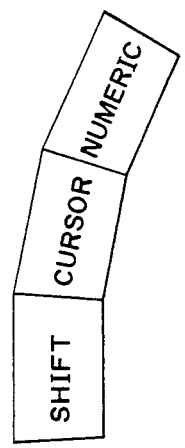

FIGS. 4 to 7 are illustrations of displayed key functions when control keys 32, 41, 33 and 43 are operated, respectively. When the CURSOR key 32 is operated, the functions of the individual finger-operated keys 1 and 2 are changed as shown in FIG. 4. For example, with the right-hand middle finger being held in position on the T key, the right-hand forefinger and ring finger are used to operate the H and N keys to move the cursor towards the left and right of the screen 11, respectively, and using the middle finger the C and W keys can be operated to move the cursor upwards and downwards with other fingers remaining in their home positions. Using the left-hand forefinger, middle finger and ring fingers, the cursor can be shifted instantly to the left, right, upper and lower extremities of the text from the center of text. Cursor movement can also be effected on a per-word basis in left and right directions as indicated by thick-line arrows with arrowheads pointed in opposite directions using the right-hand forefinger and ring finger typing the G and R keys, respectively. Scroll-up and scroll-down functions are provided by manipulating the "," and "." keys with the left-hand ring finger and middle finger, respectively. Other word processing functions that appear in the display in response to the CURSOR key 32 have a relatively high frequency of usage for document editing and formatting purposes. It is seen that any of the various high frequency usage word processing functions can be selected without compelling all the fingers of an operator's hand to leave their home positions simultaneously. A group of less frequently used word processing functions can be selected in response to operation of the FUNCTION key 41 as illustrated in FIG. 5.

Figure 6:
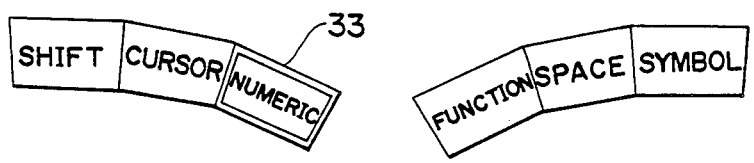
FIG. 6 is an illustration of virtual keys which appear on the display when the NUMERIC key is operated.

FIG. 6 illustrates key functions displayed in response to operation of the NUMERIC key 33. Numeral 1 to 9 digit keys are located in positions corresponding to the M, W, V, H, T, N, G, C and R keys, respectively, with the numeral 0 key being positioned to correspond to the B key. With a single touch of the left-hand thumb on the NUMERIC key 33, any of the ten digits can be easily typed by the right-hand three fingers, i.e. forefinger, middle finger and ring finger. Symbols used in arithmetic calculations, commerce and finance also appear in the data entry keys of left-hand group 1.

Figure 7:
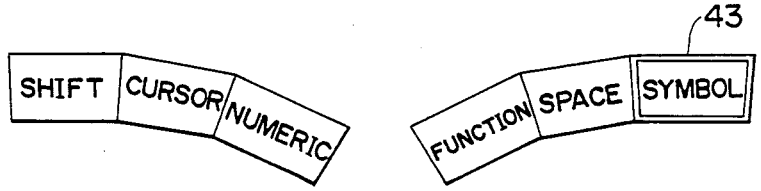
FIG. 7 is an illustration of virtual keys which appear on the display when the SYMBOL key is operated.

FIG. 7 shows a list of symbols for parentheses, braces and brackets and miscellaneous symbols which are displayed in response to operation of the SYMBOL key 43.

It is seen from the above that typing, editing and formatting operations can be made with high efficiency using a minimum number of physical keys. The use of the Dvorak Simplified Keyboard is particularly advantageous in that it increases typing efficiency with substantially equally distributed typing loads on all fingers.

The foregoing description shows only a preferred embodiment of the present invention. Various modifications are apparent to those skilled in the art without departing from the scope of the present invention which is only limited by the appended claims.

What is claimed is:

1. A keyboard apparatus for a processor having a display unit and means for generating a cursor which is movable in a screen of said display unit, said apparatus comprising:

a first row of control keys to be operated by the left-hand thumb of an operator;

a second row of control keys to be operated by the right-hand thumb of the operator;

a first group of data entry keys arranged in a matrix of three rows and five columns in a first working area adjacent said first row of control keys to be operated by the first to fourth left-hand fingers of said operator;

a second group of data entry keys arranged in a matrix of three rows and five columns in a second working area adjacent said second row of control keys to be operated by the first to fourth right-hand fingers of the operator, each of said data entry keys of each of said groups having a prescribed function when none of said control keys is operated, said first and second working areas being oriented with respect to each other so that the columns of said first and second groups are generally aligned with the left- and right-hand fingers of said operator, respectively; and control means responsive to an operation of each of the control keys of said first and second rows for varying the functions of said data entry keys of either of said groups so that when a first one of said control keys is operated virtual cursor keys are formed in one of said working areas to allow said cursor to be moved around said screen and when a second one of said control keys is operated virtual ten digit keys are formed in one of said working areas for entering numeric data, and when a third one of said control keys is operated virtual instruction keys are formed in said working areas for entering basic processing instruction data, symbols and characters.

2. A keyboard apparatus as claimed in claim 1, further comprising means for generating a display of said virtual cursor keys on said screen.

3. A keyboard apparatus as claimed in claim 1, further comprising means for generating a display of said virtual instruction keys on said screen.

4. A keyboard apparatus as claimed in claim 1, wherein the rows of said data entry keys of said first and second groups are arched to conform generally to the contours of the finger tips.

5. A keyboard apparatus as claimed in claim 1, wherein said data entry keys of said first and second groups form a Dvorak Simplified Keyboard.

6. A keyboard apparatus for a processor having a display unit and means for generating a cursor which is movable in a screen of said display unit, said apparatus comprising:
- a first row of control keys to be operated by the left-hand thumb of an operator;
- a second row of control keys to be operated by the right-hand thumb of said operator;
- a first group of data entry keys arranged in a matrix of three rows and five columns in a first working area adjacent said first row to be operated by the first to fourth left-hand fingers of said operator;
- a second group of data entry keys arranged in a matrix of three rows and five columns in a second working area adjacent said second row to be operated by the first to fourth right-hand fingers of the operator, each of said data entry keys of each of said groups having a prescribed function when none of said control keys is operated, said first and second working areas being oriented so that the columns of said first and second groups are generally aligned with the left- and right-hand fingers of said operator, respectively; and
- control means responsive to an operation of each of the control keys of said first and second rows for varying the functions of said data entry keys of either of said groups so that each of said data entry keys creates a virtual key of a specified function which is different from said prescribed function in response to the operation of each one of said control keys and generating a display of the virtual keys on said screen in positions corresponding respectively to said data entry keys.

7. A keyboard apparatus as claimed in claim 6, wherein the rows of said data entry keys of said first and second groups are arched to conform generally to the contours of the finger tips.

8. A keyboard apparatus as claimed in claim 6, wherein said specified functions of each virtual key have different frequencies of usage.

* * * * *